United States Patent
Gupta et al.

(10) Patent No.: US 10,636,426 B2
(45) Date of Patent: *Apr. 28, 2020

(54) DIGITAL ASSISTANT

(71) Applicant: Oath Inc., New York, NY (US)

(72) Inventors: Ankur Kumar Gupta, Cupertino, CA (US); Chao Tan, Cupertino, CA (US); Timothy Patrick Daly, Jr., San Jose, CA (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,326

(22) Filed: Jul. 1, 2019

(65) Prior Publication Data

US 2019/0325875 A1 Oct. 24, 2019

Related U.S. Application Data

(63) Continuation of application No. 15/396,555, filed on Dec. 31, 2016, now Pat. No. 10,339,926.

(51) Int. Cl.
*G10L 15/00* (2013.01)
*G10L 15/22* (2006.01)
*G10L 13/033* (2013.01)

(52) U.S. Cl.
CPC ............ *G10L 15/22* (2013.01); *G10L 13/033* (2013.01); *G10L 2015/223* (2013.01); *G10L 2015/228* (2013.01)

(58) Field of Classification Search
CPC ....... G10L 15/22; G10L 15/26; G10L 15/265; G10L 15/30; G10L 17/22; G10L 13/033; G10L 2015/228; G10L 13/10; G10L 2015/225; G10L 15/00; G10L 21/0364; G10L 2021/0135; G10L 25/00; G06F 3/167

See application file for complete search history.

(56) References Cited

U.S. PATENT DOCUMENTS

| | | | | |
|---|---|---|---|---|
| 6,334,103 B1* | 12/2001 | Surace | ................... | G10L 15/22 704/257 |
| 7,058,577 B2* | 6/2006 | Surace | ................ | H04M 3/4936 704/270 |
| 7,266,499 B2* | 9/2007 | Surace | ................ | H04M 3/4936 704/270 |
| 7,684,990 B2* | 3/2010 | Caskey | ................... | G10L 15/22 704/255 |

(Continued)

*Primary Examiner* — Edgar X Guerra-Erazo
(74) *Attorney, Agent, or Firm* — Cooper Legal Group, LLC

(57) ABSTRACT

One or more computing devices, systems, and/or methods for dynamically selecting a personality for a digital assistant are provided. For example, audio associated with a conversation with a digital assistant may be received from a user. The audio may be converted into a request comprising text. A task may be determined based upon the request. One or more sentences associated with information associated with the task may be determined. A context of the conversation may be determined based upon the request and a user profile of the user. A first personality may be selected for the digital assistant from one or more personalities based upon the context of the conversation. The first personality may be used to generate audio of the one or more sentences. The audio of the one or more sentences may be presented as part of the conversation to the user.

20 Claims, 13 Drawing Sheets

(56) References Cited

U.S. PATENT DOCUMENTS

| | | | | |
|---|---|---|---|---|
| 7,933,389 | B2* | 4/2011 | Kumar | H04M 3/42153 |
| | | | | 379/68 |
| 8,433,572 | B2* | 4/2013 | Caskey | G10L 15/22 |
| | | | | 704/10 |
| 8,473,618 | B2* | 6/2013 | Spear | H04L 65/1066 |
| | | | | 709/227 |
| 9,055,147 | B2* | 6/2015 | Surace | G10L 13/033 |
| 9,990,176 | B1* | 6/2018 | Gray | G06F 3/167 |
| 10,339,926 | B2* | 7/2019 | Gupta | G10L 15/22 |
| 2005/0091056 | A1* | 4/2005 | Surace | G10L 15/22 |
| | | | | 704/270.1 |
| 2006/0106612 | A1* | 5/2006 | Surace | H04M 3/493 |
| | | | | 704/270 |
| 2008/0103777 | A1* | 5/2008 | Surace | G10L 15/22 |
| | | | | 704/270 |
| 2008/0144783 | A1* | 6/2008 | Kumar | H04M 3/42153 |
| | | | | 379/88.13 |
| 2012/0046948 | A1* | 2/2012 | Leddy | G10L 13/033 |
| | | | | 704/260 |
| 2018/0190278 | A1* | 7/2018 | Gupta | G10L 15/22 |

\* cited by examiner

DIGITAL ASSISTANT

CROSS REFERENCE TO RELATED APPLICATION

This application claims priority to and is a continuation of U.S. application Ser. No. 15/396,555, filed on Dec. 31, 2016, entitled "DIGITAL ASSISTANT", which is incorporated herein.

BACKGROUND

Many services, such as websites, apps, social networks, etc., may employ various techniques to help a user to perform a task. For example, a website may display a form with various input fields that each correspond to data that may be input by the user. The user may submit the data via the form, and the website (e.g., and/or an entity with access to the website) may use the data submitted via the form to perform the task.

In an example, properly performing the task may require more than one type of information from the user. For example, to reserve a hotel room with a waterfront view, it may be necessary to first receive selection, by the user, of a hotel that has waterfront views available. The use of a single form with various input fields may thus be inconvenient, insufficient and/or inefficient. For example, the form may require visual attention from the user, which the user may be unable to provide while driving. Thus, the user may be unable to reserve the hotel until the user reaches a destination and ceases driving.

SUMMARY

In accordance with the present disclosure, one or more computing devices and/or methods for dynamically selecting a personality for a digital assistant are provided. In an example, audio associated with a conversation with a digital assistant (e.g., on a mobile device) may be received from a user (e.g., via a microphone). The audio may be converted into a request comprising text (e.g., using speech recognition). A task (e.g., that the user may intend to perform) (e.g., make a reservation) may be determined (e.g., identified) based upon the request. One or more sentences (e.g., questions, suggestions, trivia, etc.) associated with information (e.g., name, location, dates, etc.) associated with (e.g., used to perform) the task may be determined. A context of the conversation may be determined based upon the request (e.g., to make the reservation) and a user profile of the user (e.g., comprising locations of the user, history of the user, etc.). A first personality may be selected for the digital assistant from one or more personalities (e.g., actors, athletes, celebrities, etc.) based upon the context of the conversation. The first personality may be used to generate audio of the one or more sentences. The audio of the one or more sentences may be presented (e.g., played) as part of the conversation (e.g., via a speaker) to the user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
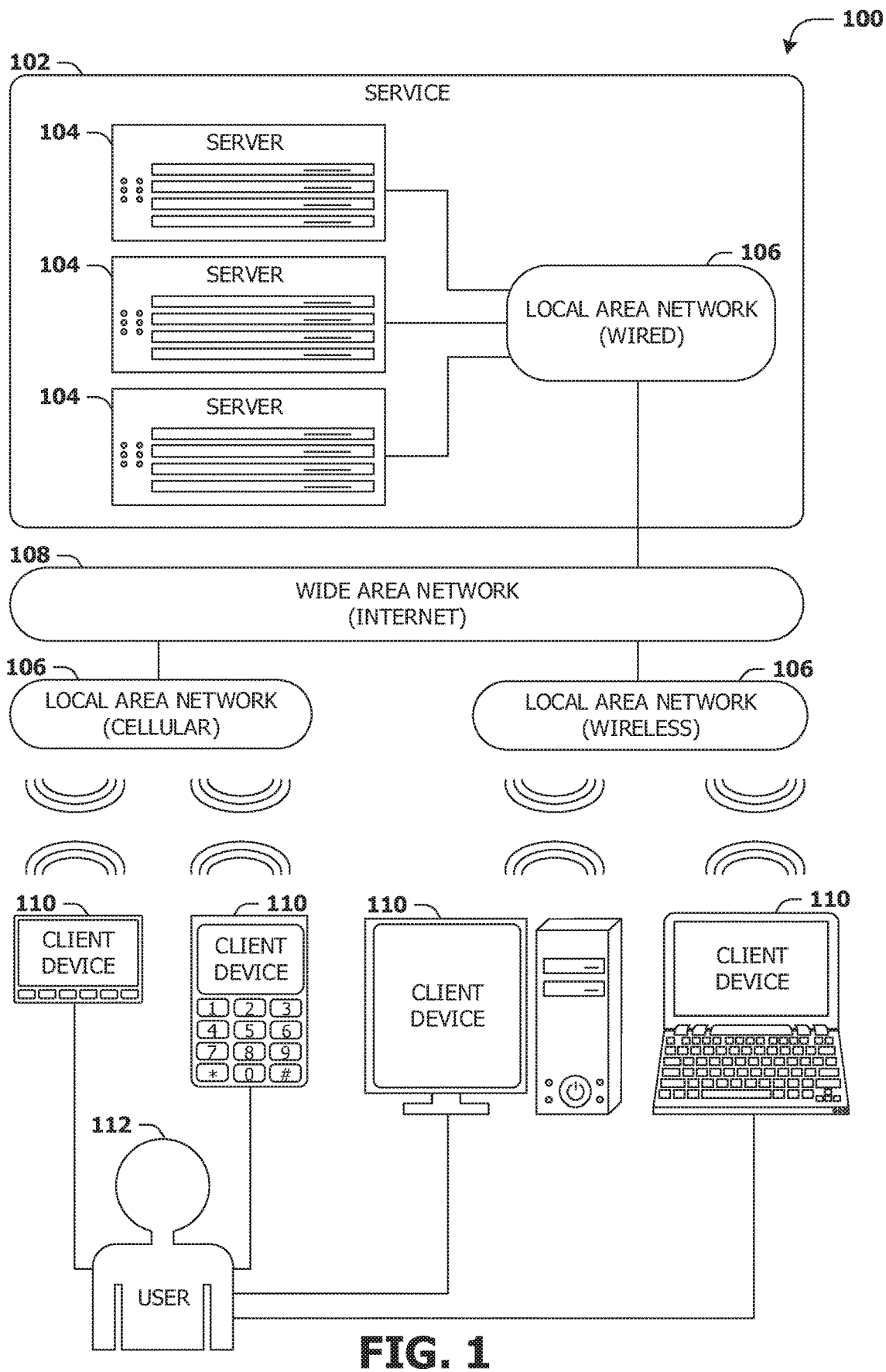
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
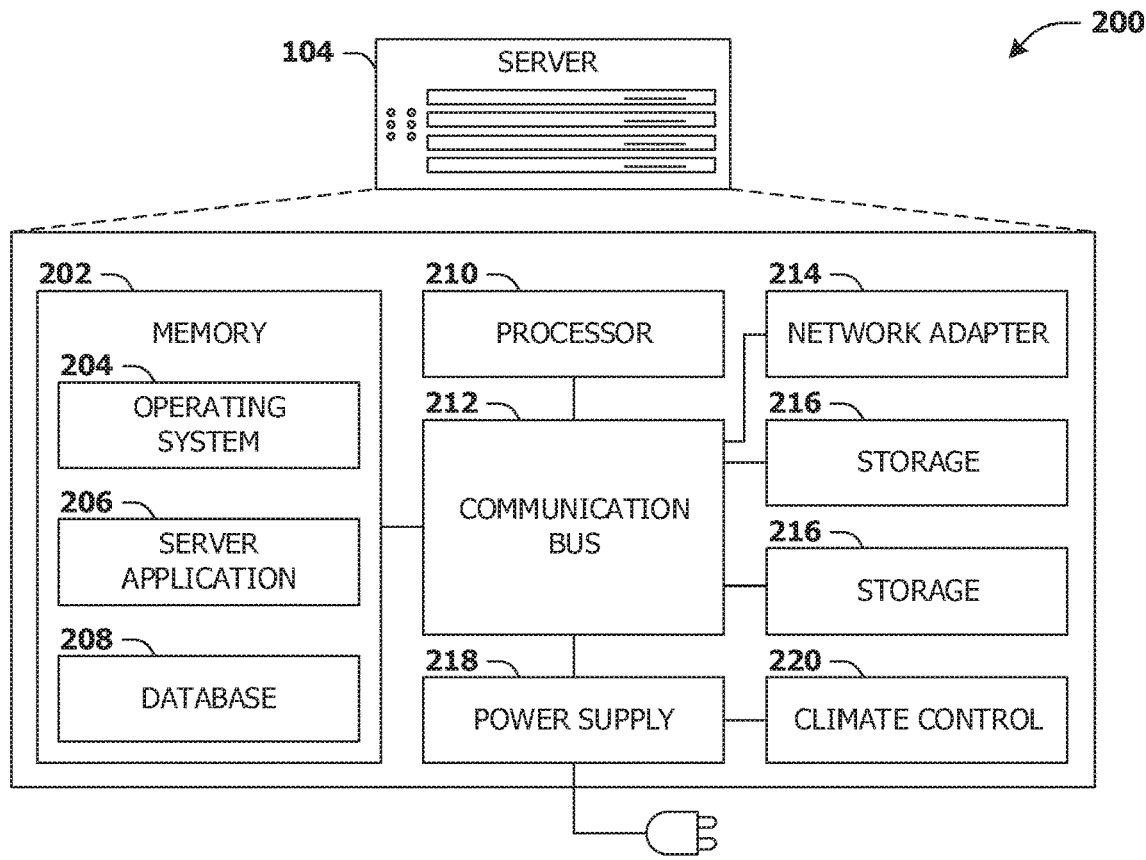
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
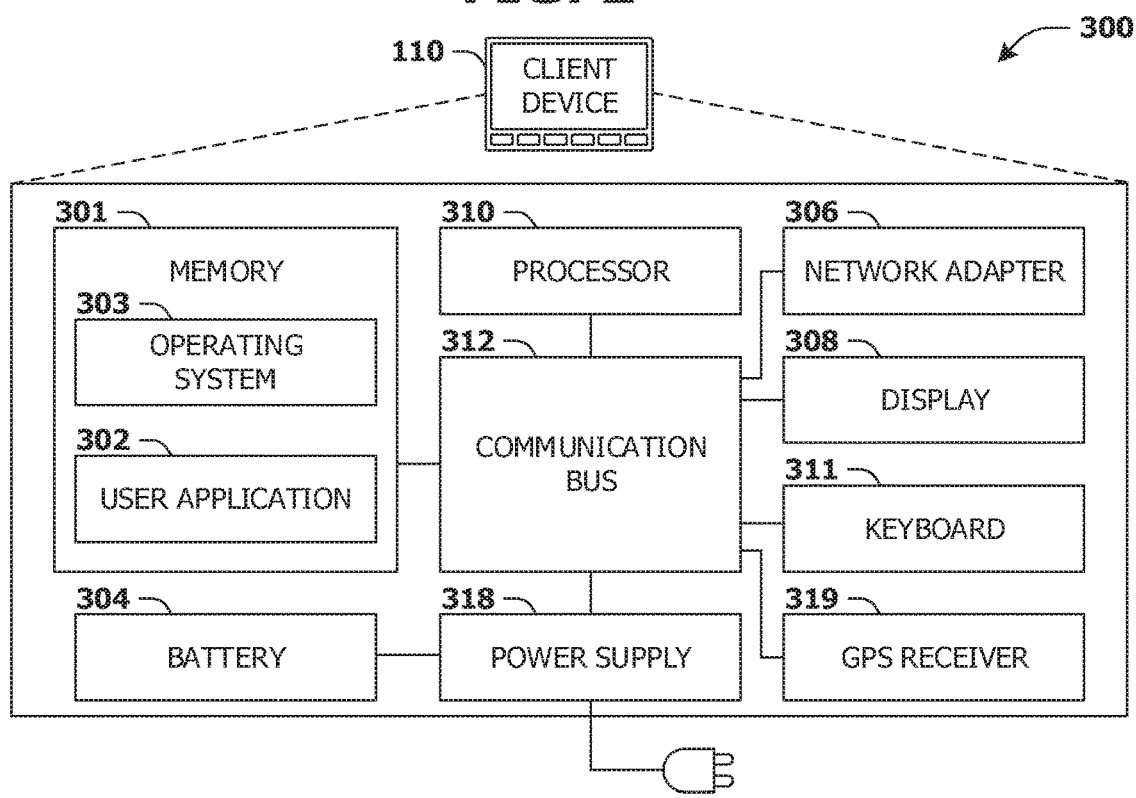
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for dynamically selecting a personality for a digital assistant are provided. For example, a user may want to perform a task, such as make a reservation (e.g., at a hotel, restaurant, etc.). Performance of the task may use and/or require one or more pieces of information, and thus may consume a significant amount of attention, time and/or resources of the user (e.g., to find an appropriate entity, to contact the entity, to communicate a desire of the user to the entity, to provide information used to perform the task to the entity, etc.). A (e.g., voice-based) digital assistant may be used to assist the user in performing the task. The digital assistant may have a single voice that communicates with the user, irrespective of what task the user wants to perform. For example, the single voice may be used when the user wants to perform a first task associated with sports and when the user wants to perform a second task associated with science. The single voice may be monotonous, uninteresting and/or tiring for the user, and as a result, the user may avoid using the digital assistant in situations where such use would be useful and save time, resources, etc. Thus, in accordance with one or more of the techniques presented herein, a personality may dynamically be selected for the digital assistant to encourage the user to perform the task in a manner that is efficient, convenient, low cost and/or timely. Similarly, as provided herein, a service that works with a messaging interface may be used to assist the user in dynamically selecting the personality and/or to perform the task.

Figure 4:
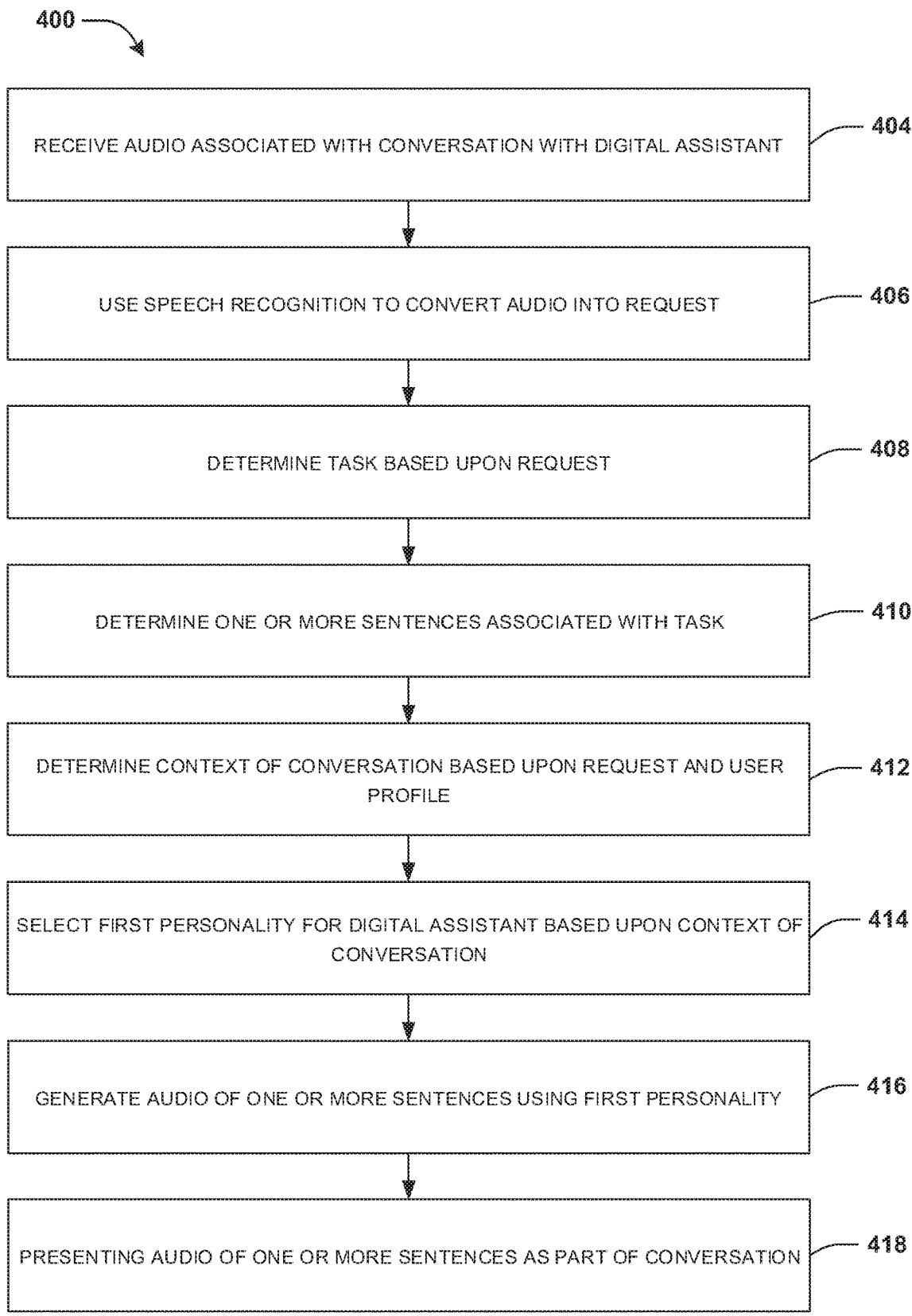
FIG. 4 is a flow chart illustrating an example method for dynamically selecting a personality for a digital assistant.

An embodiment of dynamically selecting a personality for a digital assistant is illustrated by an example method 400 of FIG. 4. A user, such as user Jill, may access and/or interact with a digital assistant (e.g., and/or another service). The digital assistant may be accessed and/or interacted with via one or more interfaces on a device of the user, such as a microphone and/or a messaging (e.g., chat, text messaging, etc.) interface of a mobile device. The user may interact with the digital assistant by providing one or more voice commands into the microphone. In an example, the user may interact with the digital assistant by typing a message into the messaging interface. Accordingly, at 404, audio may be received (e.g., by the digital assistant) from the user (e.g., such as voice, by the user, etc.). The audio may be associated with (e.g., a part of) a conversation (e.g., of the user) with the digital assistant. The audio may be received via the microphone of the device. At 406, the audio may be converted into a request comprising text. The converting may be performed using one or more speech recognition techniques. In an example, the request may comprise one or more sentences in a first language, such as English. The request may, for example, be made as a part of a chat conversation or a text messaging conversation (e.g., with the digital assistant, with another user, etc.), etc. At 408, a task (e.g., that the user may intend to perform) may be determined (e.g., identified) based upon the request. In an example, the one or more sentences may be analyzed and/or scanned for keywords to determine a likely objective of the user (e.g., using natural language processing, word/phrase matching, etc.).

At 410, one or more sentences (e.g., questions) that are associated with (e.g., information associated with (e.g., required to perform)) the task may be determined (e.g., using a finite-state machine (FSM) associated with the task). For example, a determination may be made that certain information is needed and/or may be useful to perform the task. The one or more sentences may be designed to request and/or obtain the information from the user. For example, if an exemplary task requires a name and age of the user to be properly performed, a first exemplary question inquiring about the name of the user (e.g., "What is your name?") and a second exemplary question inquiring about the age of the user (e.g., "What is your age?") may be determined.

At 412, a context of the conversation may be determined based upon the request and/or a user profile of the user. The user profile may comprise and/or be created using information associated with the user such as (e.g., current, past, visited, home, office, shopping, etc.) locations of the user (e.g., determined using a GPS unit of the device), a history of communications associated with the user (e.g., chat, email, text messages, phone calls, etc.), a calendar of the user, a search history of the user, a browsing history of the user, etc. For example, one or more purchases (e.g., of books, movies, tickets, products, services, etc.) of the user may be determined by scanning the communications associated with the user, and stored in the user profile. In another example, one or more frequent destinations of the user may be determined by scanning the past locations of the user, and stored in the user profile. In another example, one or more interests (e.g., sports, food, finance, education, science, technology, languages, woodworking, etc.) of the user may be determined based upon the information associated with the user, and stored in the user profile. In another example, travel plans (e.g., a future destination) of the user may be predicted based upon (e.g., purchased tickets identified in) the information associated with the user, and stored in the user profile. The context of the conversation may be determined by identifying one or more portions of the user profile relevant to the request and/or the task.

At 414, a first personality may be selected from a plurality of personalities based upon the context of the conversation. The plurality of personalities may be stored in a database of personalities. The database of personalities may be stored on the device or on a server accessed by the device via a network connection. In an example, the database of personalities may be dynamically updated to improve one or more personalities or to introduce one or more new personalities (e.g., based upon the information associated with the user, based upon a trend among a plurality of users, in response to a request by one or more users, etc.). The personalities may each correspond to a celebrity, an athlete, a character (e.g., from a movie, show, cartoon, etc.), an actor, a political figure, or a historical figure. For example, the first personality may correspond to a first political figure, while a second personality may correspond to a first athlete. In an example, the first personality may be selected over the second personality in response to determining that the context of the conversation is associated with politics, and/or that the first political figure is likely to be of more interest to the user than the first athlete. In the database, the first personality may be stored in association with a first topic, while the second personality may be stored in association with a second topic (e.g., different than the first topic).

It may be appreciated that a personality may comprise one or more dimensions (e.g., in combination) associated with an entity (e.g., an individual). A first dimension of the personality may be a voice of the entity, a second dimension of the personality may be a tone of the entity, a third dimension of the personality may be manners of the entity, a fourth dimension of the personality may be a style of the entity, a fifth dimension of the personality may be preferred words and phrases of the entity, etc.

It may further be appreciated that a model of a personality may be built by mining one or more databases (e.g., to determine one or more dimensions of the personality), such as social media of an individual corresponding to the personality, news articles, interviews (e.g., text, audio and/or video), scripts (e.g., of a movie or TV show corresponding to the personality). Alternatively and/or additionally, the individual corresponding to the personality may be interviewed to obtain audio of the individual pronouncing one or more desired words, and the model of the personality may be built and/or supplemented using the audio from the interview.

In an example, a first degree of relevance of the first personality to the context of the conversation may be calculated, and a second degree of relevance of a second personality of the plurality of personalities to the context of the conversation may be calculated. The degrees of relevance may be based upon topical relevance of the respective personalities to the context and/or user relevance, for example. Timeliness, authority and/or novelty may also factor into determining the degrees of relevance. If a determination is made that the first degree of relevance is greater than the second degree of relevance, the first personality is selected. If instead, a determination is made that the second degree of relevance is greater than the first degree of relevance, the second personality is selected. In an example, the first personality may correspond to a voice of a first person and the second personality may correspond to a voice of a second person different than the first person.

At 416, audio of the one or more sentences may be generated using the first personality. For example, the digital assistant may be configured to operate, process input and/or provide output while adopting the first personality of the first political figure. For example, the one or more sentences may be customized to incorporate preferred words and phrases of the first political figure, and audio resembling the voice of the first political figure speaking in the tone of the first political figure may be generated.

At 418, the audio of the one or more sentences may be presented as part of the conversation to the user. For example, the audio may be output via a speaker. It may be appreciated that the audio of the one or more sentences may be a response to the audio received from the user, and that the user may thus feel as though the user is conversing with (e.g., and/or being guided by) the first political figure rather than the device.

In some examples, the audio is presented in response to determining that the user prefers that the conversation be continued in an audio format of a plurality of formats of communication stored in a second database than in one or more other formats (e.g., text, email, video, etc.) of the plurality of formats of communication.

In one example of determining the one or more sentences, a plurality of sentences comprising the one or more sentences may be ranked. It may be appreciated that the plurality of sentences may be ranked based upon past requests and/or actions by the user and/or other information associated with (e.g., received from) the user, past requests and/or actions by users other than the user and/or other information associated with (e.g., received from) users other than the user, and/or based upon other information, such as default settings, local, regional and/or global settings, etc. A determination may be made that the one or more sentences are ranked above a threshold (e.g., but that one or more other sentences in the plurality of sentences are not ranked above the threshold). The one or more sentences may thus be selected for presentation based upon the determination that the one or more sentences are ranked above the threshold (e.g., but the one or more other sentences in the plurality of sentences may not be selected for presentation based upon the determination that they are not ranked above the threshold). For example, the top X (e.g., 1, 2, 3, 4 . . . ) ranked sentences may be selected for presentation. It may be appreciated that the selection of the one or more sentences may be reflective of a determination that the user is likely to respond to the one or more sentences.

In some examples, a plurality of personalities may be selected for the digital assistant based upon the context of the conversation, in response to a (single) request. For example, the first personality and a third personality may be concurrently used and/or may be alternated in the conversation if a determination is made that both personalities are relevant to the context and/or share a common background. For example, the first personality may correspond to a first character and the third personality may correspond to a second character that featured in a same story, movie, show, etc. as the first character.

In some examples, audio associated with a response to the audio of the one or more sentences may be received (e.g., via the microphone) from the user. The audio may be converted into a response comprising text. The task may be performed based upon the response. For example, for an exemplary task of making a reservation, where a first exemplary answer choice comprising the name John is received, the reservation may be made (e.g., by contacting the service and/or one or more other services, servers, etc.) in the name of John. It may be appreciated that confirmation and/or information associated with the performance of the task may be provided to the user.

In some examples, after 418, second audio (e.g., speech comprising "who was Elvis") may be received from the user via the microphone in association with the (e.g., same) conversation with the digital assistant. Speech recognition may be used to convert the second audio into a second request comprising text (e.g., different than the request). A second task (e.g., a request for information about Elvis) may be determined based upon the second request. One or more second sentences (e.g., "Elvis was an American musical icon") associated with the second task may be determined, and a second context of the conversation may be determined based upon the second request and the user profile of the user (e.g., indicating that the user is an avid music fan). A second personality (e.g., of a musician, or known musical commentator) may be selected for the digital assistant from the plurality of personalities based upon the second context of the conversation. Audio of the one or more second sentences may be generated using the second personality and presented to the user (e.g., via the speaker).

In some examples, a first agent may be selected from a plurality of the agents (e.g., stored in a database) based upon the task. The first agent may be configured to perform at least some of the task (e.g., reserve a hotel), while a second agent of the plurality of the agents may be configured to perform one or more other tasks (e.g., reserve a restaurant). For example, a first degree of relevance of the first agent to the task may be calculated, and a second degree of relevance of the second agent of the plurality of agents to the task may be calculated. If a determination is made that the first degree of relevance is greater than the second degree of relevance, the first agent may be selected. Instructions to perform the task may be provided via the first agent. Confirmation that the task has been performed via the first agent may be received, and audio indicative of the confirmation as part of the conversation may be presented to the user (e.g., via the speaker).

In some examples, after the audio is presented, feedback associated with the conversation may be received (e.g., from the user). For example, the feedback may comprise speech saying "what a great guy" or "I hate that guy." Alternatively and/or additionally, a tone associated with approval or disapproval may be detected in the feedback. Based upon the feedback, the first personality may be raised or lowered in a ranking of personalities and/or an indication of a like or dislike of the first personality may be stored in user profile.

It may be appreciated that audio is one example of a format that can be used in the conversation. Examples that incorporate (e.g., merely or additionally) text, or video, are also contemplated. For example, the first personality may include a first video (e.g., of an actual person, an animation, etc.) of a character, and in the video, lips of the character may be dynamically displayed in a manner that matches speech in audio expressed by the character in the conversation.

Figure 5A:
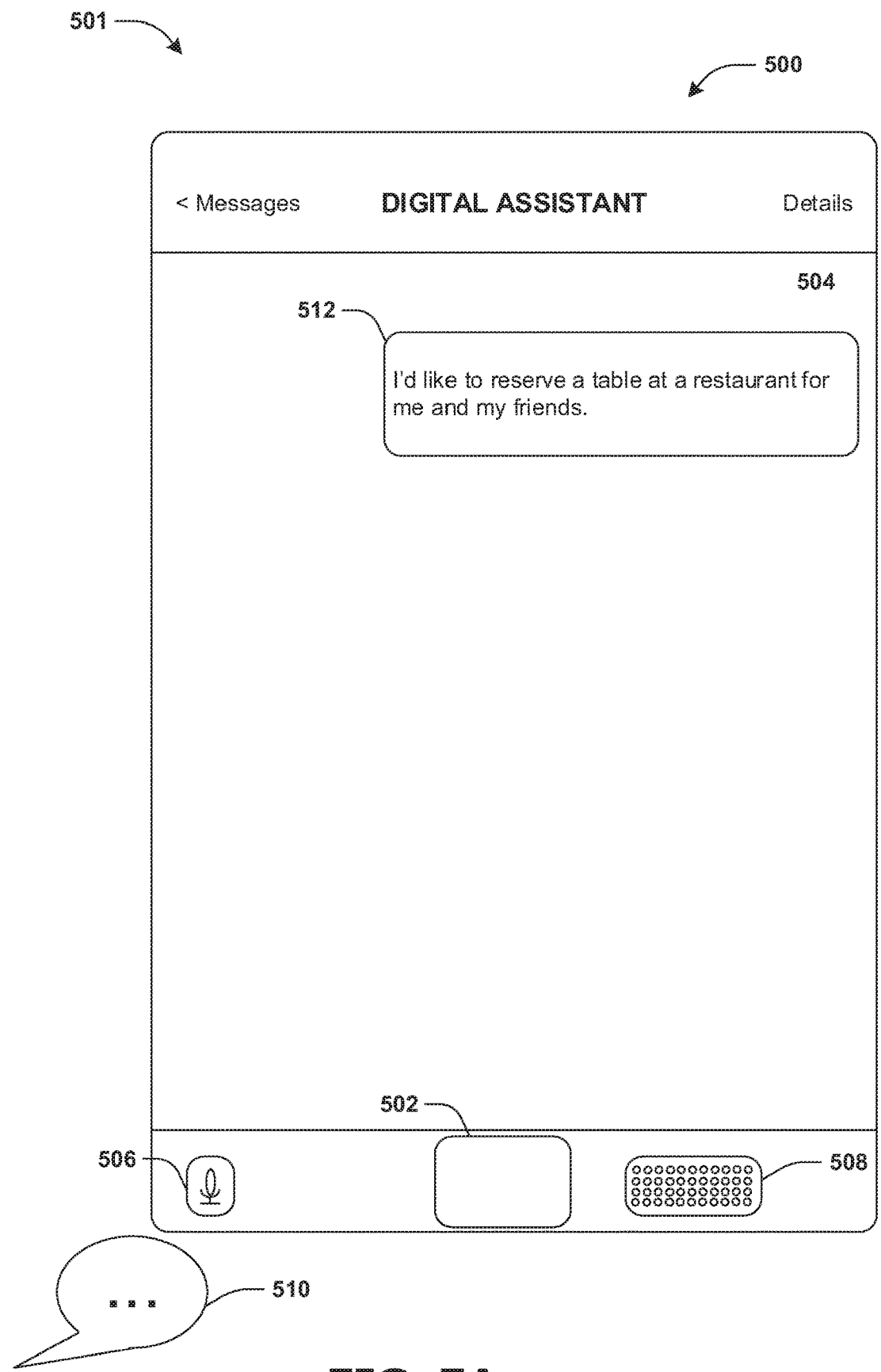
FIG. 5A is a component block diagram illustrating an example system for dynamically selecting a personality for a digital assistant, where a user is making a request.

FIGS. 5A-5I illustrate examples of a system 501 for dynamically selecting a personality for a digital assistant. FIG. 5A illustrates a device 500 of the user displaying a digital assistant interface. The device 500 may comprise a button 502, a microphone 506 and a speaker 508. The digital assistant interface may comprise an area 504 for display of a conversation between the user and a second user (e.g., the digital assistant). Audio 510 comprising speech may be received (e.g., from the user) via the microphone 506 and converted into a request 512 comprising text, which may be displayed in the area 504. For example, the audio 510 may comprise the user saying "I'd like to reserve a table at a restaurant for me and my friends," and speech recognition may be used to generate the request 512.

Figure 5B:
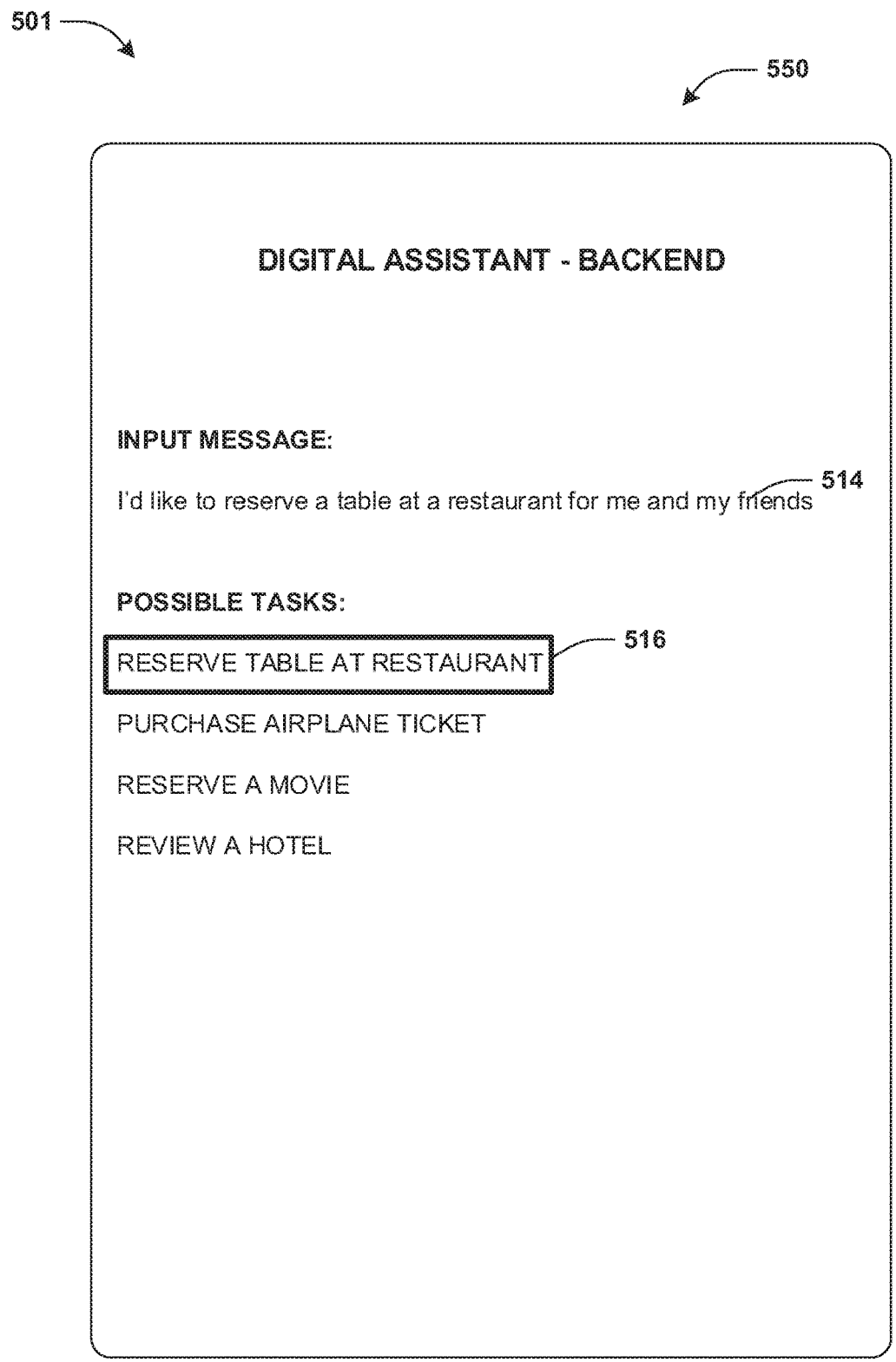
FIG. 5B is a component block diagram illustrating an example system for dynamically selecting a personality for a digital assistant, where a task is determined.

FIG. 5B illustrates a backend system 550 (e.g., on the device 500 of the user, on a server connected to the device via a network, etc.) that may receive and/or classify the request 512 from the user as an input message 514. A task 516 (e.g., that the user may intend to perform) may be determined (e.g., identified, predicted, selected, etc.) based upon the request 512. For example, the backend system 550 may access a database comprising a plurality of tasks (e.g., and one or more keywords, terms, types and/or formats of information, metadata, etc. associated with each task), and may select the task 516 "reserve table at restaurant" from the plurality of tasks (e.g., upon determining that the task 516, compared to the remaining tasks of the plurality of tasks, is the most likely to be desired to be performed by the user based upon an analysis of the request 512). It may be appreciated that supplemental information associated with the task 516, such as location, date, etc., may also be determined based upon the request 512. For example, the presence of the words "reserve" and "restaurant" in the request 512 may be used to determine that the user would like to make a reservation at a restaurant, while the presence of the words "me and my friends" may be used to determine an estimate of a number of people (e.g., three or more) associated with performance of the task 516, and the absence of a date may be used to predict that the task is associated with a current day.

Figure 5C:
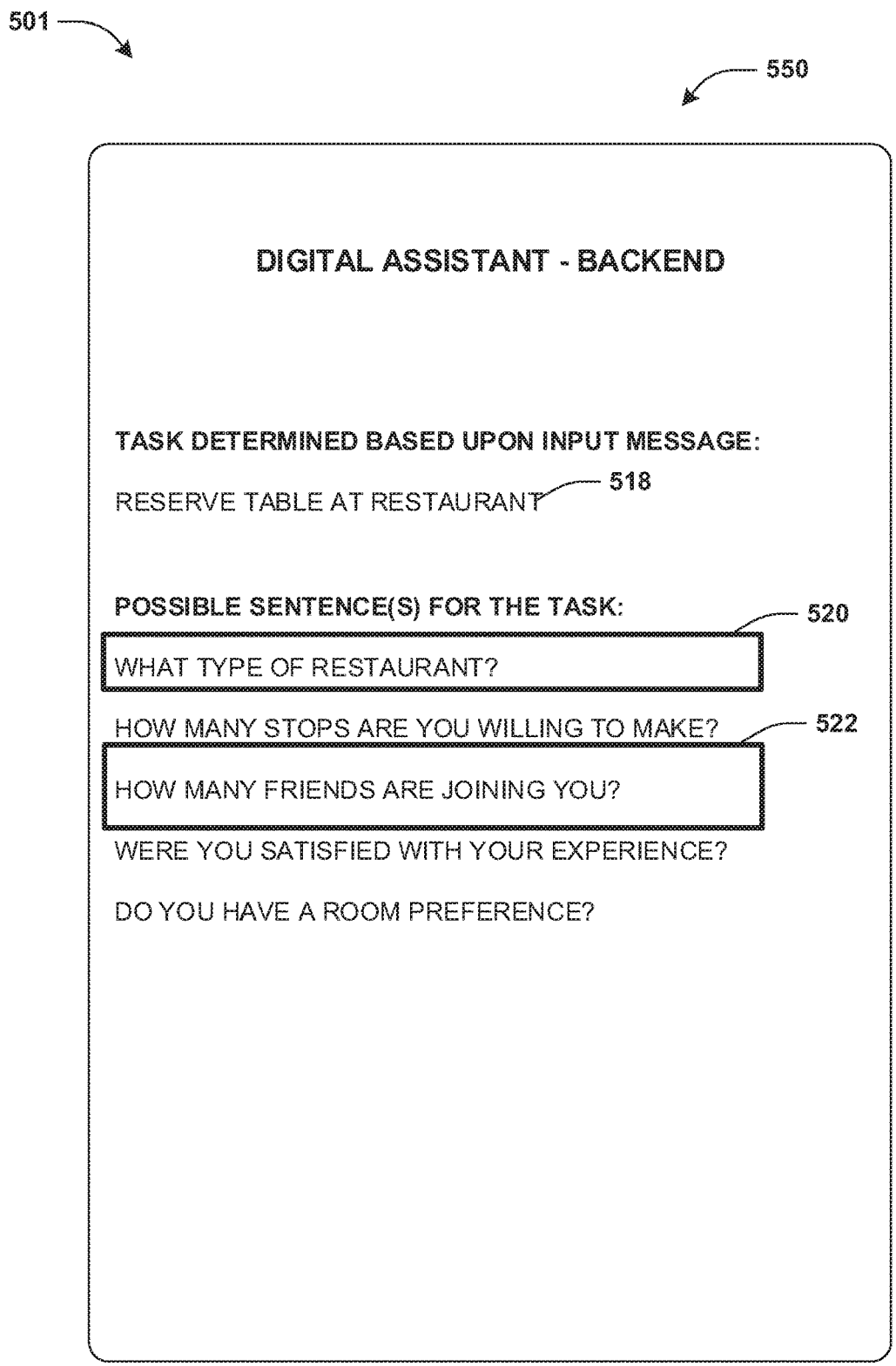
FIG. 5C is a component block diagram illustrating an example system for dynamically selecting a personality for a digital assistant, where one or more sentences associated with information required to perform a task are determined.

FIG. 5C illustrates the backend system 550 receiving and/or classifying the task 516 from the user as an input 518 and using the input 518 determined based upon the request 512 to determine one or more sentences (e.g., questions, statements, etc.) associated with (e.g., information required to perform) the task 518. For example, the backend system 550 may access a database comprising a plurality of sentences (e.g., and one or more keywords, terms, types and/or formats of information, metadata, etc. associated with each sentence), and may select first sentence 520 "What type of restaurant?" and/or second sentence 522 "How many friends are joining you" from the plurality of sentences (e.g., upon determining that the first sentence 520 and/or the second sentence 522, compared to the remaining sentences of the plurality of sentences, are the most likely to be associated with information needed and/or useful in performing the input 518).

Figure 5D:
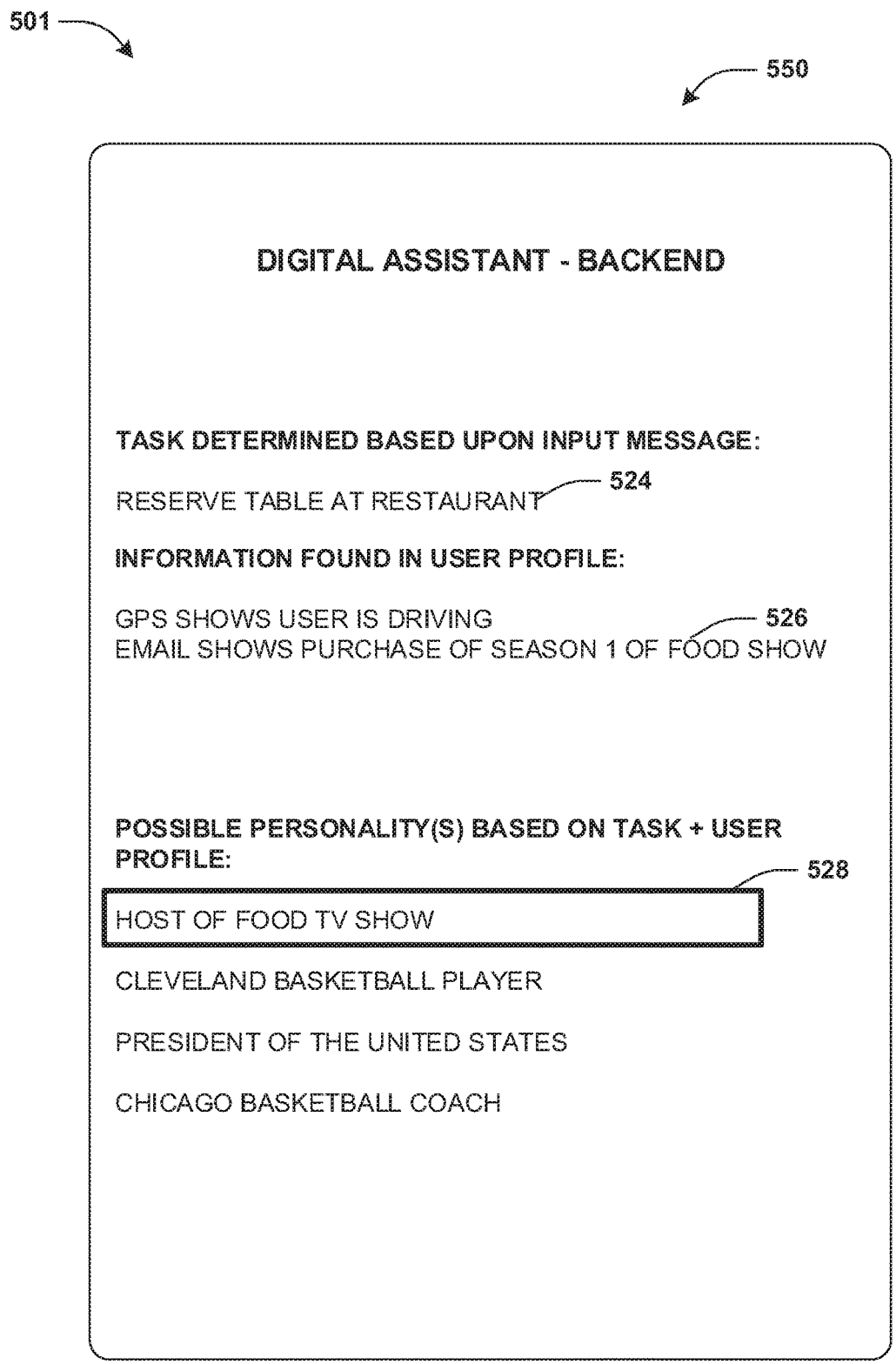
FIG. 5D is a component block diagram illustrating an example system for dynamically selecting a personality for a digital assistant, where the personality is selected.

FIG. 5D illustrates the backend system 550 receiving and/or classifying the task 516 from the user as an input 524, receiving and/or classifying information from a user profile of the user as input 526, and using the input 524 determined based upon the task 516 and/or the input 526 from the user profile to determine one or more personalities (e.g., characters, actors, athletes, coaches, politicians, etc.) associated with (e.g., sharing a common genre, theme, topic, era, etc.) the input 524 and/or the input 526 of the user profile. For example, the backend system 550 may access a database comprising a plurality of personalities (e.g., and one or more keywords, terms, types and/or formats of information, metadata, etc. associated with each personality), and may select first personality 528 "Host of Food TV Show" from the plurality of personalities (e.g., upon determining that the first personality 528, compared to the remaining personalities of the plurality of personalities, is the most likely to be of interest to the user based upon the input 524 and the input 526). This selection may be based upon a previous purchase, by the user, of a season of a food-related TV show being identified in the user profile (e.g., after being extracted from a TV browsing history, an email account and/or another messaging account of the user). The user profile may also comprise an indication of a current location of the user, which may be determined based upon a GPS (e.g., or other location identification mechanism) component of the device. A determination that the current location is changing faster than a threshold rate may be used to determine whether the user is driving (e.g., or otherwise traveling in a motor vehicle), walking, stationary, etc., which may be used to select the first personality 528 and/or for making one or more other determinations disclosed herein.

Figure 5E:
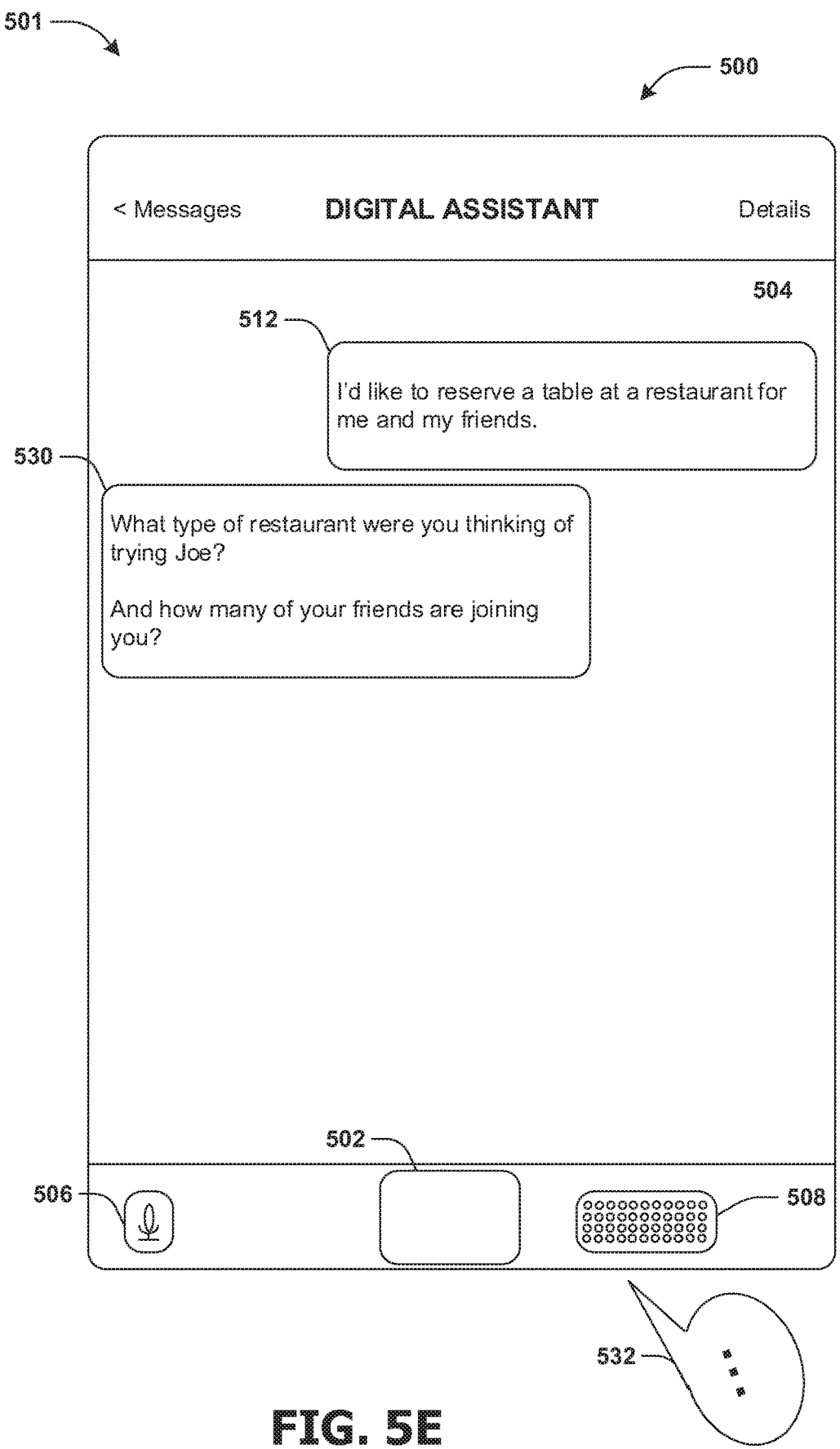
FIG. 5E is a component block diagram illustrating an example system for dynamically selecting a personality for a digital assistant, where one or more sentences are presented to a user using the personality.

FIG. 5E illustrates (e.g., versions of) the first sentence 520 and the second sentence 522 of the one or more sentences associated with the task 516 being provided (e.g., via the digital assistant interface) as text 530 and/or as speech output as audio 532 via the speakers 508 of the device 500. For example, the text 530 and/or the audio 532 may express the sentences "What type of restaurant were you thinking of trying Joe?" and "And how many of your friends are joining you?". The first sentence 520 and/or the second sentence 520 may be modified and/or customized based upon the first personality 528 selected in FIG. 5D. For example, the first sentence 520 and/or the second sentence 522 may be customized to be pronounced with a regional accent associated with the first personality 528, and/or to include key words or phrases associated with the first personality 528 (e.g., and/or to exclude key words, phrases, etc. not associated or negatively associated with the first personality 528). In another example, the first sentence 520 and/or the second sentence 522 may be customized to be long winded, concise, polite, blunt, etc. depending upon the first personality 528.

Figure 5F:
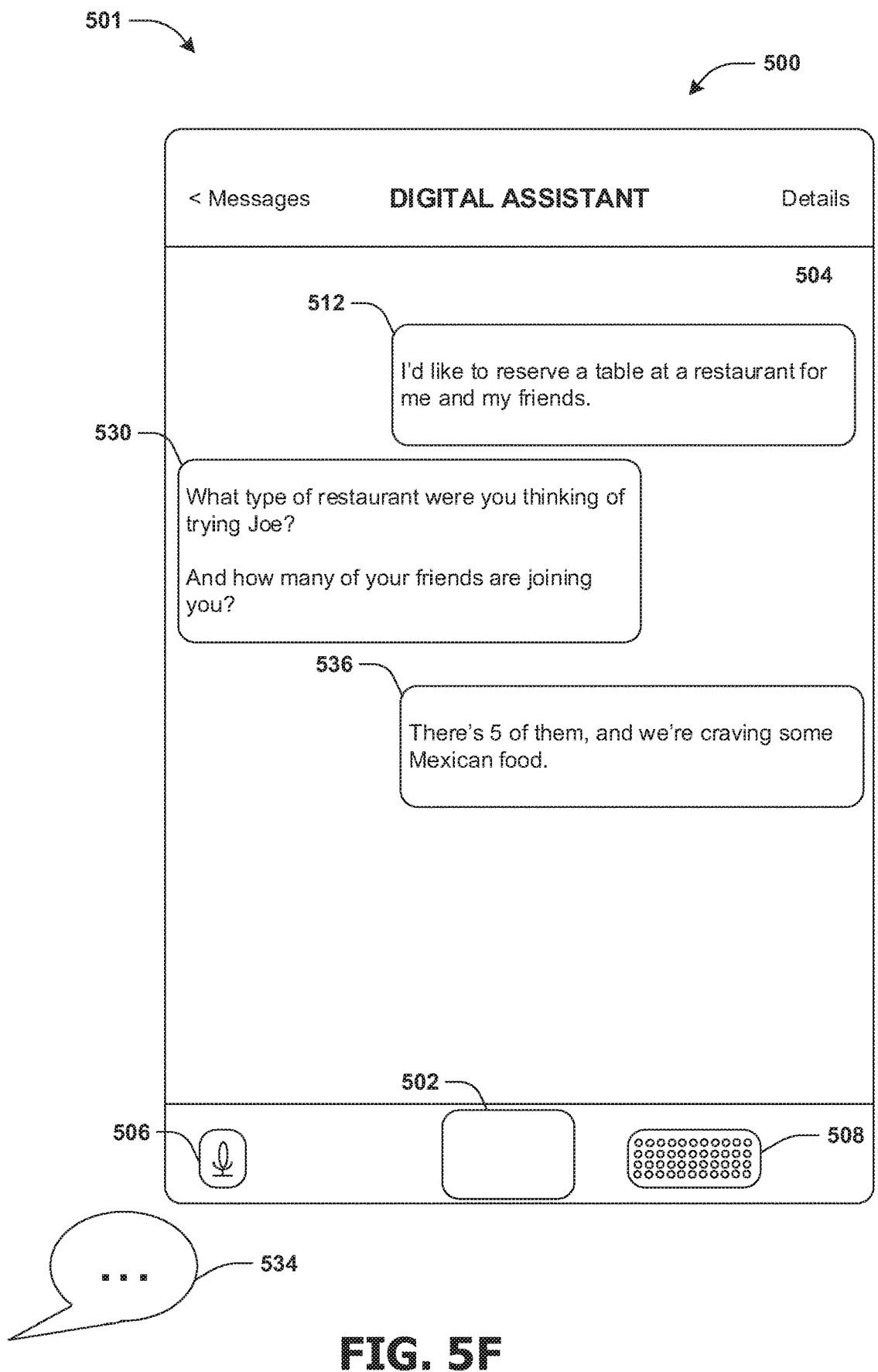
FIG. 5F is a component block diagram illustrating an example system for dynamically selecting a personality for a digital assistant, where a user is responding to one or more sentences.

FIG. 5F illustrates the receipt of a response to the first sentence 520 and/or the second sentence 522 (e.g., comprising "There's 5 of them, and we're craving some Mexican food") from the user (e.g., via the microphone 506). The response may be audio 534 comprising speech by the user, which may be converted into text 536 using speech recognition.

Figure 5G:
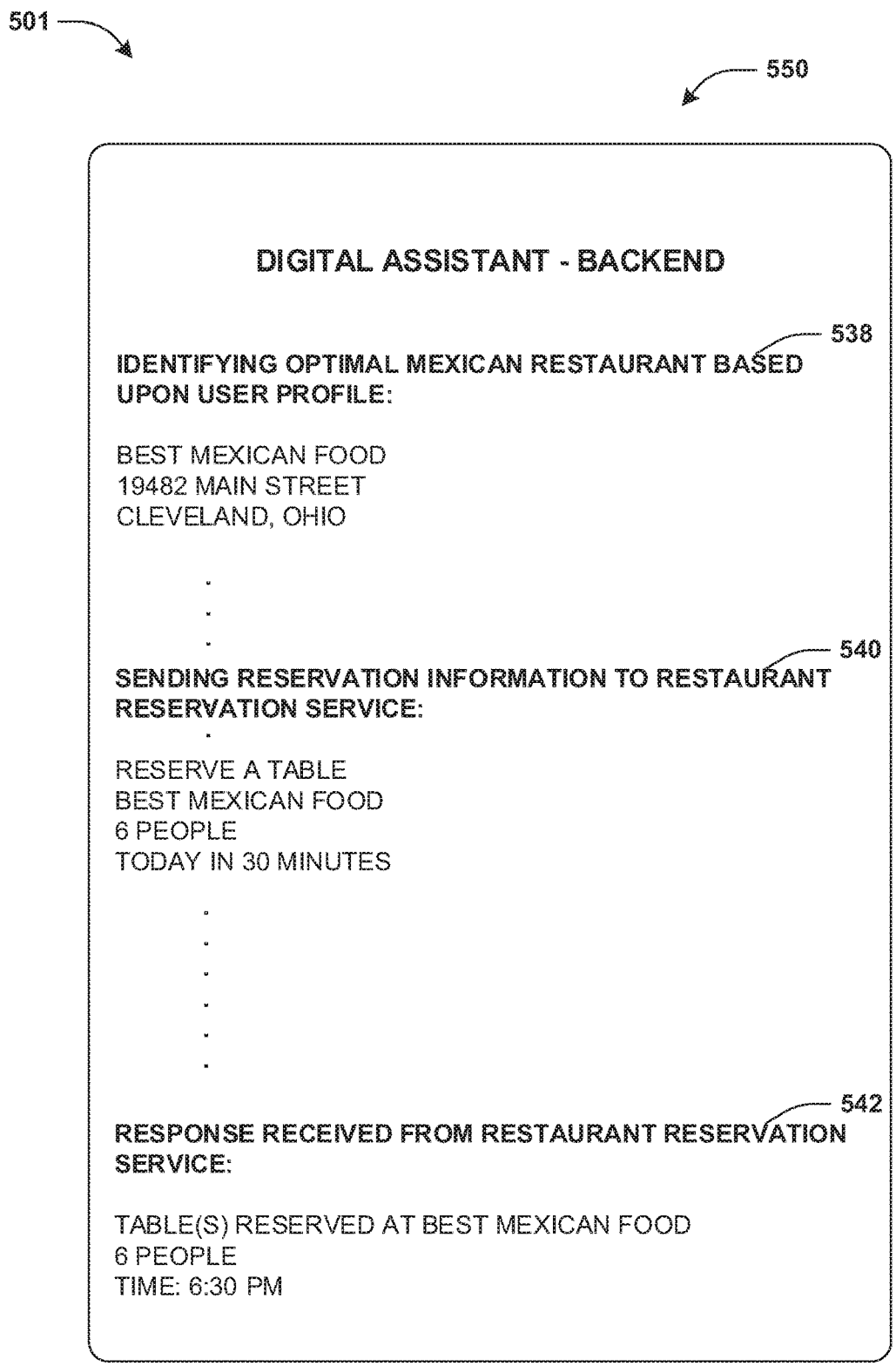
FIG. 5G is a component block diagram illustrating an example system for dynamically selecting a personality for a digital assistant, where a task is performed.

FIG. 5G illustrates the backend system 550 using the response (e.g., and one or more other indications associated with the request 512, the task 516, the user profile, etc.) to perform the task 516. For example, the backend system 550 may identify 538 a provider suitable for the task 516, submit 540 information determined based upon the request 512, such as an indication of the desire to reserve a table at a restaurant, and information determined based upon the response by the user, such as an indication of the desire for the restaurant to be a Mexican restaurant and to seat 6 people, to one or more services (e.g., a restaurant reservation service). It may be appreciated that the submitted information may be formatted by the backend system 550 in a manner associated with the one or more services. The backend system 550 may receive a response 542 (e.g., a confirmation, error, denial, etc.) from the one or more services.

Figure 5H:
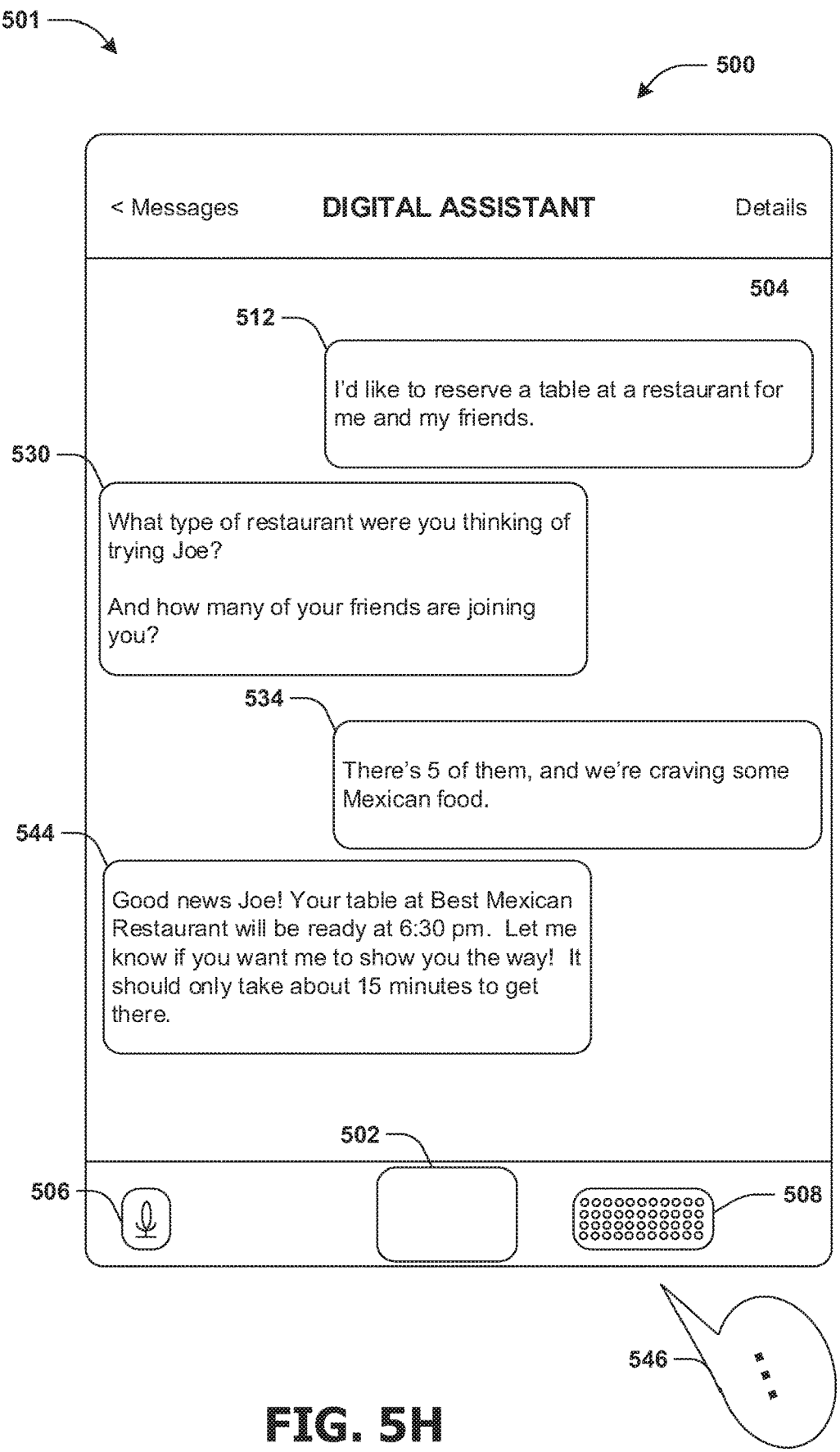
FIG. 5H is a component block diagram illustrating an example system for dynamically selecting a personality for a digital assistant, where a user is notified of performance of a task.

FIG. 5H illustrates the receipt, by the user, of a confirmation of performance of the task 516, via audio 546 comprising speech and/or text 544. For example, the confirmation may include details about the task 516, such as location, time, cost and/or a confirmation code. The confirmation may be modified and/or customized based upon the first personality 528 selected in FIG. 5D.

Figure 5I:
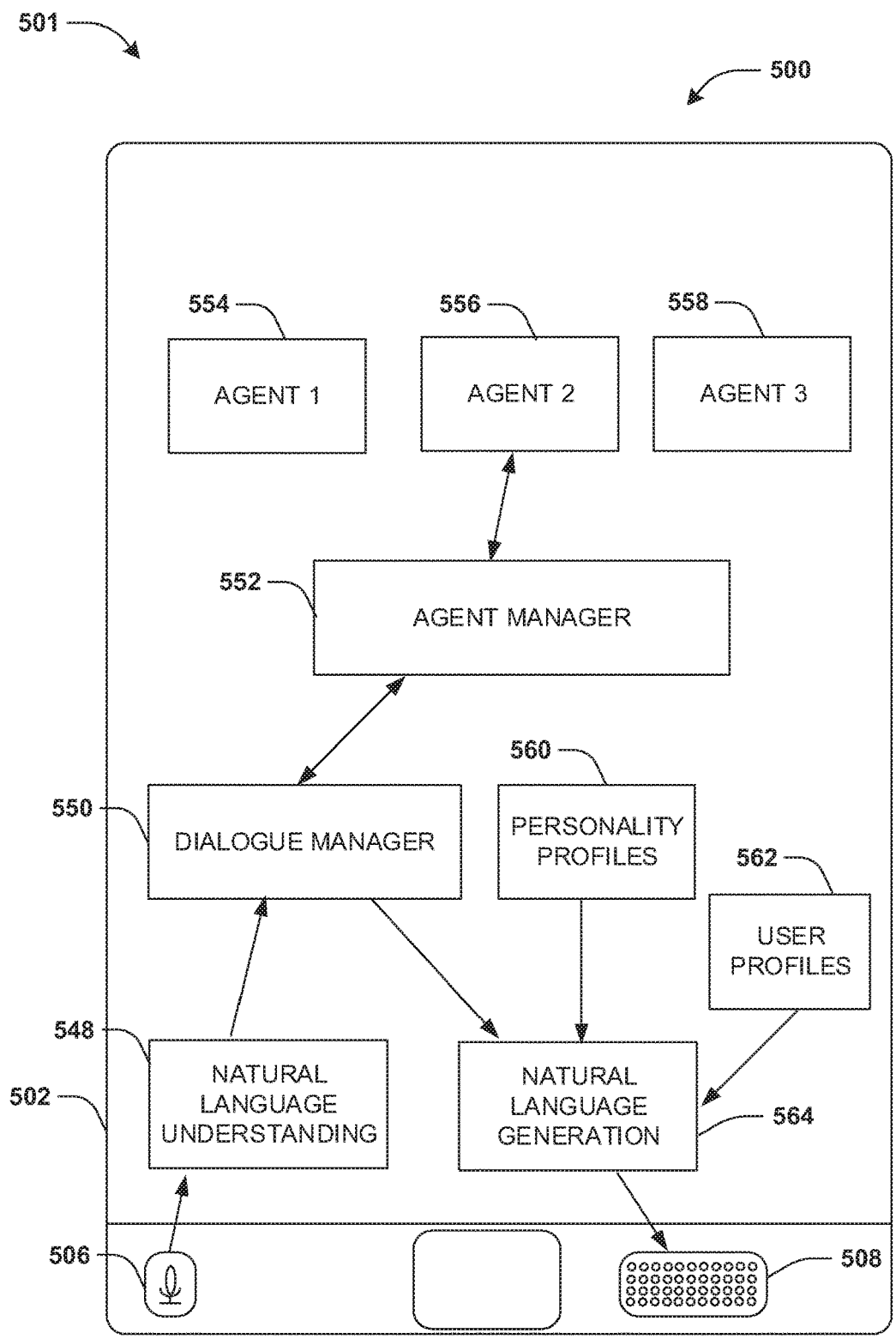
FIG. 5I is a component block diagram illustrating an example system for dynamically selecting a personality for a digital assistant.

FIG. 5I illustrates an exemplary system of components of the digital assistant of the device 500 that may be used to perform one or more of the actions described herein. For example, a natural language understanding component 548 may receive audio comprising user speech received from the microphone 506 and may convert the user speech into text (e.g., using speech recognition). A dialogue manager 551 may determine a task associated with the text and/or one or more sentences with which to respond to the user speech. An agent manager 552 may determine an agent 556 of a plurality of agents (e.g., 554, 556, 558, etc.) for performing the task (e.g., making a reservation). A natural language generation component 564 may select a personality profile from a personality profiles component 560 based upon a user profile of the user identified in a user profiles component 562. The natural language generation component 564 may use the personality profile to customize the one or more sentences determined by the dialogue manager 551, and may output audio comprising speech of the customized one or more sentences via the speaker 508.

It may be appreciated that the disclosed subject matter may assist a user in performing various tasks including but not limited to the reservation of a hotel, the reservation of a flight, the reservation of a rental car, the reservation of a restaurant, various travel arrangements, the selection of a gift (e.g., for a relative, significant other, etc.), the ordering of one or more subcomponents (e.g., groceries) needed to make a component (e.g., a meal) and/or investing (e.g., in a market). It may be appreciated that each contemplated task could be associated with one or more different and/or same sentences. For example, while reservation of a hotel may be associated with sentences inquiring about a time, location, room preferences and/or number of occupants, investing may be associated with sentences inquiring about a level of acceptable risk, a market preference, etc. Embodiments are also contemplated where at least some of the disclosed subject matter may be used to assist the user in various informational, educational and/or instructional applications, such as a guidebook for a location (e.g., a zoo, museum, etc.), learning to cook, learning a language (e.g., German, C++, etc.) and/or learning a subject (e.g., electromagnetics).

In some examples, at least some of the disclosed subject matter may be implemented on a client (e.g., a device of a user), and in some examples, at least some of the disclosed subject matter may be implemented on a server (e.g., hosting a service accessible via a network, such as the Internet).

Figure 6:
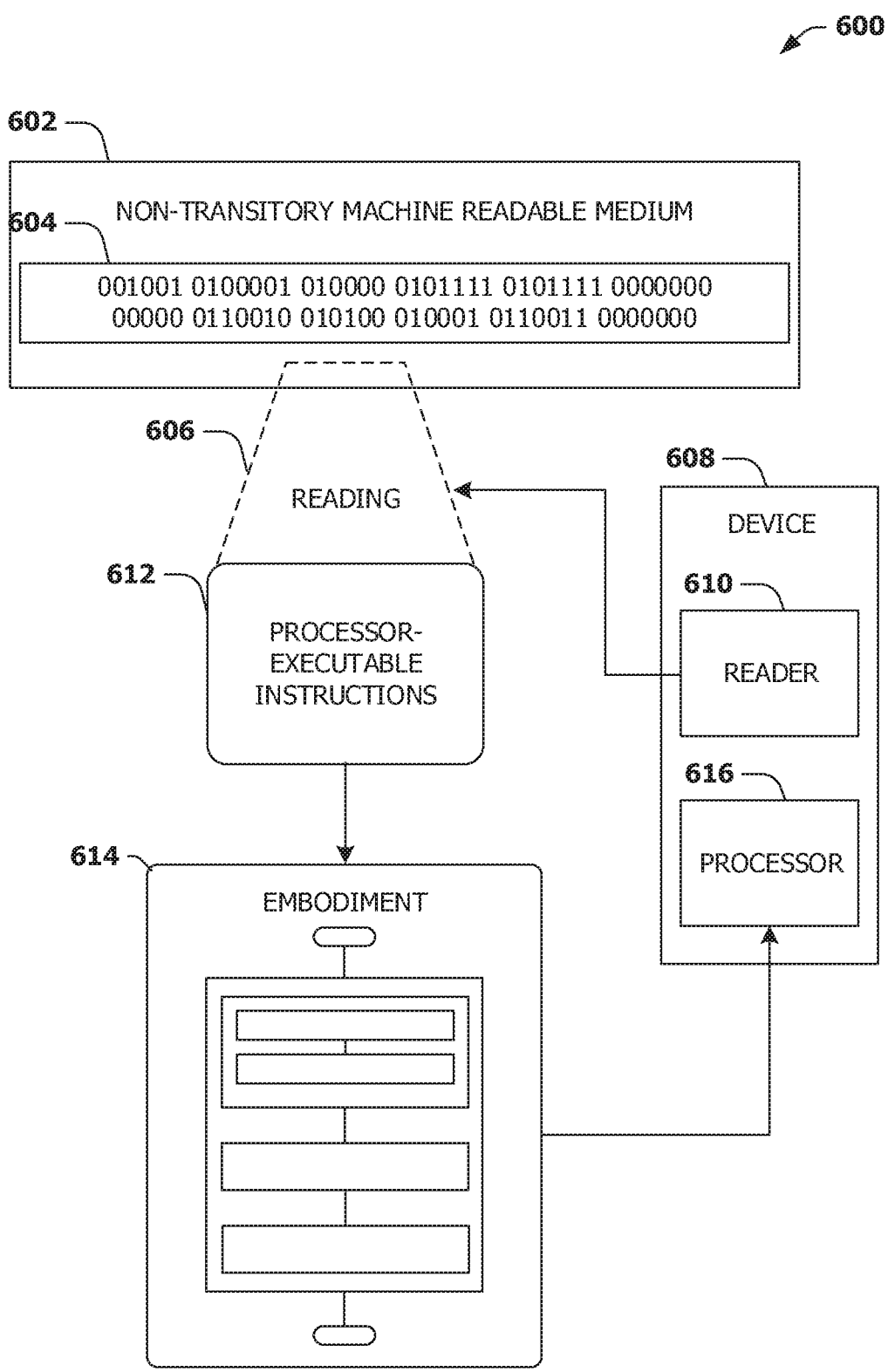
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance and/or implementation of an embodiment 614, such as at least some of the example method 400 of FIG. 4, for example, and/or at least some of the example system 501 of FIGS. 5A-5I, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for dynamically selecting a personality for a digital assistant, comprising:
receiving audio associated with a conversation with a digital assistant;
using speech recognition to convert the audio into a request comprising text;
determining a task based upon the request;
determining one or more sentences associated with the task;
determining a context of the conversation based upon the request and a user profile of a user;
calculating a first degree of relevance of a first personality, of a plurality of personalities, to the context of the conversation, wherein the first personality corresponds to a voice of a first person and the plurality of personalities corresponds to voices of a plurality of people;
calculating a second degree of relevance of a second personality, of the plurality of personalities, to the context of the conversation;
in response to determining that the first degree of relevance is greater than the second degree of relevance, selecting the first personality from the plurality of personalities;
generating audio of the one or more sentences with the voice of the first person using the first personality; and
presenting the audio of the one or more sentences with the voice of the first person as part of the conversation, via a speaker, to the user.

2. The method of claim 1, wherein the one or more sentences comprise one or more questions associated with information required to perform the task.

3. The method of claim 1, comprising:
after the presenting the audio of the one or more sentences, receiving second audio, from the user via a microphone, associated with the conversation with the digital assistant;
using speech recognition to convert the second audio into a second request comprising text; and
determining a second task based upon the second request.

4. The method of claim 1, wherein the second personality corresponds to a voice of a second person.

5. The method of claim 3, comprising:
determining one or more second sentences associated with the second task;
determining a second context of the conversation based upon the second request and the user profile of the user;
selecting the second personality, for the digital assistant, from the plurality of personalities based upon the second context of the conversation; and
generating audio of the one or more second sentences using the second personality.

6. The method of claim 5, comprising:
presenting the audio of the one or more second sentences as part of the conversation, via the speaker, to the user.

7. The method of claim 1, comprising:
selecting a first agent from a plurality of agents stored in a database based upon the task.

8. The method of claim 7, comprising:
providing instructions to perform the task via the first agent.

9. The method of claim 8, comprising:
receiving confirmation that the task has been performed via the first agent.

10. The method of claim 9, comprising:
presenting audio indicative of the confirmation as part of the conversation, via the speaker, to the user.

11. The method of claim 1, wherein:
the audio associated with the conversation is received from the user via a microphone.

12. The method of claim 1, wherein:
the generating audio is performed in response to determining that the user prefers that the conversation be continued in an audio format of a plurality of formats of communication stored in a database than in one or more other formats of the plurality of formats of communication.

13. The method of claim 1, wherein:
the generating audio is performed in response to determining that the user prefers that the conversation be continued in an audio format of a plurality of formats of communication stored in a database than in a written format.

14. The method of claim 1, comprising:
after the presenting the audio of the one or more sentences, receiving feedback associated with the conversation; and
lower the first personality in a ranking of personalities for the user based upon the feedback.

15. A computing device comprising:
a processor; and
memory comprising processor-executable instructions that when executed by the processor cause performance of operations, the operations comprising:
receiving a request, from a user, associated with a conversation with a digital assistant;
determining a task based upon the request;
determining one or more sentences associated with the task;
determining a context of the conversation based upon the request and a user profile of the user;
selecting a first personality, for the digital assistant, from a plurality of personalities stored in a database based upon the context of the conversation, wherein each personality of the plurality of personalities is stored in the database in association with one or more topics, wherein the selecting the first personality is based upon a determination that at least one of the context of the conversation or the task is associated with a first topic in association with which the first personality is stored in the database;
generating output of the one or more sentences using the first personality; and
presenting the output of the one or more sentences as part of the conversation to the user.

16. The computing device of claim 15, wherein:
the output comprises at least one of audio of the one or more sentences, text of the one or more sentences or video of the one or more sentences.

17. A non-transitory machine readable medium having stored thereon processor-executable instructions that when executed cause performance of operations, the operations comprising:

- receiving a request, from a user, associated with a conversation with a digital assistant;
- determining a task based upon the request;
- determining one or more sentences associated with the task;
- determining a context of the conversation based upon the request and a user profile of the user;
- calculating a first degree of relevance of a first personality, of a plurality of personalities stored in a database, to the context of the conversation;
- calculating a second degree of relevance of a second personality, of the plurality of personalities, to the context of the conversation;
- in response to determining that the first degree of relevance is greater than the second degree of relevance, selecting the first personality, for the digital assistant, from the plurality of personalities;
- generating output of the one or more sentences using the first personality; and
- presenting the output of the one or more sentences as part of the conversation to the user.

18. The non-transitory machine readable medium of claim 17, wherein:

the output comprises audio of the one or more sentences.

19. The non-transitory machine readable medium of claim 17, wherein:

the output comprises text of the one or more sentences.

20. The non-transitory machine readable medium of claim 17, wherein:

the output comprises video of the one or more sentences.

* * * * *